(12) United States Patent
Ananda et al.

(10) Patent No.: US 12,352,346 B2
(45) Date of Patent: Jul. 8, 2025

(54) LIGHTWEIGHT GEAR (71) Applicant: HONEYWELL INTERNATIONAL INC., Charlotte, NC (US)

(72) Inventors: Varun Ananda, Bangalore (IN); Hima Bindu Kocherla, Hyderabad (IN); Pramod Padmanabha, Bangalore (IN)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 452 days.

(21) Appl. No.: 17/813,072

(22) Filed: Jul. 18, 2022

(65) Prior Publication Data
US 2023/0383833 A1 Nov. 30, 2023

(30) Foreign Application Priority Data
May 25, 2022 (IN) .............................. 202211029954

(51) Int. Cl.
F16H 55/14 (2006.01)
F16H 55/06 (2006.01)
F16H 55/17 (2006.01)

(52) U.S. Cl.
CPC ............. F16H 55/14 (2013.01); F16H 55/06 (2013.01); F16H 55/17 (2013.01)

(58) Field of Classification Search
CPC .......... F16H 55/14; F16H 55/06; F16H 55/17; F16H 55/02
See application file for complete search history.

(56) References Cited

U.S. PATENT DOCUMENTS

| | | | |
|---|---|---|---|
| 2,839,943 A | 6/1958 | Caldwell et al. | |
| 5,592,999 A | * 1/1997 | Matsuura | B62K 25/283 180/227 |
| 6,622,584 B2 | * 9/2003 | Staehle | G01M 17/0074 74/478 |
| 9,296,157 B1 | 3/2016 | Handschuh et al. | |
| 10,228,024 B2 | 3/2019 | Hallman | |
| 10,371,243 B2 | 8/2019 | Modrzejewski et al. | |
| 10,890,241 B2 | 1/2021 | Leupold et al. | |

(Continued)

FOREIGN PATENT DOCUMENTS

| | | | |
|---|---|---|---|
| CN | 212004151 U | 11/2020 | |
| DE | 102014003441 A1 * | 9/2015 | B22F 10/20 |

(Continued)

OTHER PUBLICATIONS

Belsak, Ramadani, R., et al., "Topology Optimization Based Design of Lightweight and Low Vibration Gear Bodies," Int J Simul Model 17 (Mar. 2018) 1, 92-104, downloaded from https://www.researchgate.net/publication/323782286 on Apr. 16, 2018.

Primary Examiner — Zakaria Elahmadi
(74) Attorney, Agent, or Firm — Lorenz & Kopf, LLP (57) ABSTRACT A lightweight gear includes a hub, and a tooth ring defining a plurality of gear teeth. The tooth ring includes an inner core composed of a polymer-based material that is coupled to the lattice structure. The lightweight gear includes a lattice structure interconnecting the hub and the tooth ring. The lattice structure has a density that varies radially based on an operating condition of the lightweight gear and the lattice structure is composed of a metal or a metal alloy.

19 Claims, 7 Drawing Sheets (56) References Cited

U.S. PATENT DOCUMENTS

| | | | |
|---|---|---|---|
| 2007/0087617 A1* | 4/2007 | Oberle | F16H 55/06 439/395 |
| 2016/0003339 A1* | 1/2016 | Roberts, III | F16H 55/17 74/446 |
| 2020/0165936 A1 | 5/2020 | Kasal et al. | |
| 2021/0102612 A1* | 4/2021 | Cornell | F16H 57/0006 |
| 2021/0180675 A1 | 6/2021 | Bartolomeo | |
| 2021/0222588 A1* | 7/2021 | Kasal | B22F 3/15 |

FOREIGN PATENT DOCUMENTS

| | | | | |
|---|---|---|---|---|
| DE | 102012102775 B4 | 10/2020 | | |
| EP | 0894212 A2 | 2/1999 | | |
| EP | 3660282 A1 | 6/2020 | | |
| GB | 2568907 A | 6/2019 | | |
| WO | WO-2015162388 A1 * | 10/2015 | | B29B 11/14 |
| WO | 2016124514 A1 | 8/2016 | | |
| WO | 2021004847 A1 | 1/2021 | | |
| WO | 2021069186 A1 | 4/2021 | | |

* cited by examiner

LIGHTWEIGHT GEAR

CROSS REFERENCE TO RELATED APPLICATION

This application claims priority to Indian Provisional Patent Application No. 202211029954, filed May 25, 2022, the entire content of which is incorporated by reference herein.

TECHNICAL FIELD

The present disclosure generally relates to gears, and more particularly relates to a lightweight gear for a vehicle.

BACKGROUND

Gears may be used in various mechanical systems to transmit torque and speed. Gears may be employed in a variety of different applications, including vehicle applications, for example. Generally, gears are generally composed of a single material. For example, gears may be composed of a solid metal or metal alloy to provide wear resistance. The use of a solid metal or metal alloy gear, however, results in the gear having a high weight. In addition, a solid metal or metal alloy gear may generate undesirable noise when in operation.

Accordingly, it is desirable to provide a lightweight gear, which also reduces noise while in operation. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a lightweight gear. The lightweight gear includes a hub, and a tooth ring defining a plurality of gear teeth. The tooth ring includes an inner core composed of a polymer-based material that is coupled to the lattice structure. The lightweight gear includes a lattice structure interconnecting the hub and the tooth ring. The lattice structure has a density that varies radially based on an operating condition of the lightweight gear and the lattice structure is composed of a metal or a metal alloy.

The tooth ring includes an outer liner coupled to the inner core that defines contact surfaces for the plurality of gear teeth. The outer liner is composed of a second metal or a second metal alloy. The inner core includes a plurality of projections that extend radially inward to couple to the lattice structure. The inner core includes a plurality of core teeth opposite the plurality of projections, and the outer liner is coupled to the plurality of core teeth to define the plurality of gear teeth. A portion of the plurality of core teeth are radially misaligned with a portion of the plurality of projections. The lattice structure defines a plurality of channels about an outer perimeter of the lattice structure, and each channel of the plurality of channels extends axially and is configured to receive a projection of the plurality of projections. The lightweight gear includes a polymer-based coating coupled to the lattice structure. The lightweight gear includes at least one panel of polymer-based material coupled to at least one side of the lattice structure. The operating condition of the lightweight gear is a shear stress. The lattice structure has a first zone with a first density at the hub that is different and greater than a zone density of a zone of the lattice structure at the tooth ring. The lattice structure has a second zone with a second density between the first zone and the zone, and the second density is less than the first density and the zone density. The lattice structure has a third zone with a third density between the second zone and the zone, and the third density is less than the second density. The lattice structure includes a fourth zone with a fourth density between the third zone and the zone, and the fourth density is greater than the third density. A cell of the lattice structure in the third zone has a different shape than a cell of the lattice structure in the first zone.

Also provided is a lightweight gear for a vehicle. The lightweight gear includes a hub composed of a first metal or metal alloy and a tooth ring including an inner core and an outer liner that cooperate to define a plurality of gear teeth. The inner core is composed of a polymer-based material that is coupled to a lattice structure and the outer liner is composed of a second metal or a second metal alloy. The lightweight gear includes the lattice structure interconnecting the hub and the inner core of the tooth ring. The lattice structure has a density that varies radially, with a first zone having a first density proximate the hub that is different and greater than a zone density of a zone of the lattice structure proximate the inner core. The lattice structure is composed of a metal or metal alloy.

Between the first zone and the zone, the lattice structure has a second zone with a second density that is less than the first density and the zone density. The inner core includes a plurality of projections that extend radially inward to couple to the lattice structure and includes a plurality of core teeth opposite the plurality of projections. At least one of the plurality of projections is misaligned with at least one of the plurality of core teeth, and the outer liner is coupled to the plurality of core teeth to define the plurality of gear teeth. The includes a polymer-based coating coupled to the lattice structure. The lightweight gear includes at least one panel of polymer-based material coupled to at least one side of the lattice structure.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses.

Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of device that would benefit from the lightweight gear described herein and the use of the lightweight gear in a vehicle is merely one exemplary embodiment according to the present disclosure. In addition, while the lightweight gear is described herein as being used with a vehicle, such as a bus, motorcycle, train, motor vehicle, marine vessel, aircraft, rotorcraft and the like, the various teachings of the present disclosure can be used with other stationary platforms. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

Figure 1:
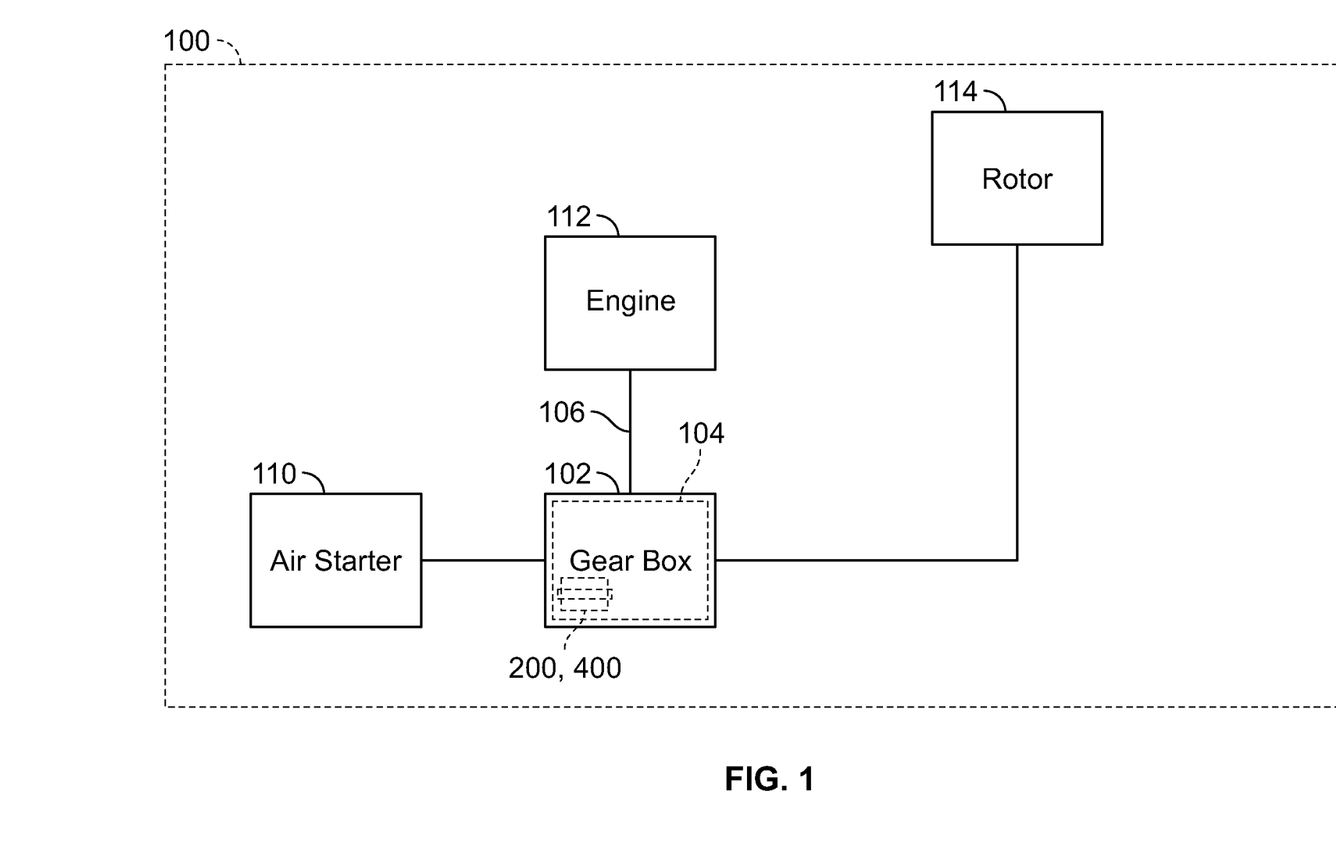
FIG. 1 is a functional block diagram of a vehicle, which includes a lightweight gear in accordance with the various teachings of the present disclosure.

With reference to FIG. 1, a functional block diagram of components associated with a vehicle 100, which in this example is a rotorcraft, is shown. In this example, the vehicle 100 includes at least one lightweight gear 200. It should be noted that while the lightweight gear 200 is described herein as being used with components associated with the vehicle 100, the lightweight gear 200 may be employed in various applications, and thus, the use of the lightweight gear 200 with the vehicle 100 is merely an example. In the example of FIG. 1, the lightweight gear 200 is associated with a gear box 102 of the vehicle 100. The gear box 102 includes at least one or more of the lightweight gear 200, which cooperate to form a gear train 104 within the gear box 102. In one example, the gear train 104 of the gear box 102 transfers torque to a shaft 106. The gear train 104 may drive the shaft 106, based on input received from an air starter 110 associated with the vehicle 100, for example, or the gear train 104 may be driven by an engine 112 of the vehicle 100 to supply torque to a rotor 114 associated with the vehicle 100. The air starter 110 is any air starter capable of converting air into mechanical torque, which is transferred via the gear train 104 to the shaft 106 to rotate or turn the engine 112 until the engine 112 reaches ignition speed. In another example, the gear train 104 of the gear box 102 may drive the shaft 106 based on input received from an electric motor or actuator associated with the vehicle 100. The engine 112 is any engine for powering the vehicle 100, and in one example, is a gas turbine engine, such as a turboprop or turboshaft engine. During operation of the engine 112, the engine 112 drives the shaft 106, which in turn drives the gear train 104 to transmit torque to the rotor 114. The rotor 114 is any rotor associated with the vehicle 100, including a main rotor or the tail rotor. As will be discussed, the use of the lightweight gear 200 in the gear box 102 reduces a weight associated with the gear box 102, and thus, the weight of the vehicle 100. The reduction in weight may result in an increased fuel economy for the vehicle 100. In addition, the use of the lightweight gear 200 also reduces a noise associated with the operation of the gear train 104 within the gear box 102. The use of the lightweight gear 200 also assists in dampening vibrations experienced by the gear box 102.

Figure 2:
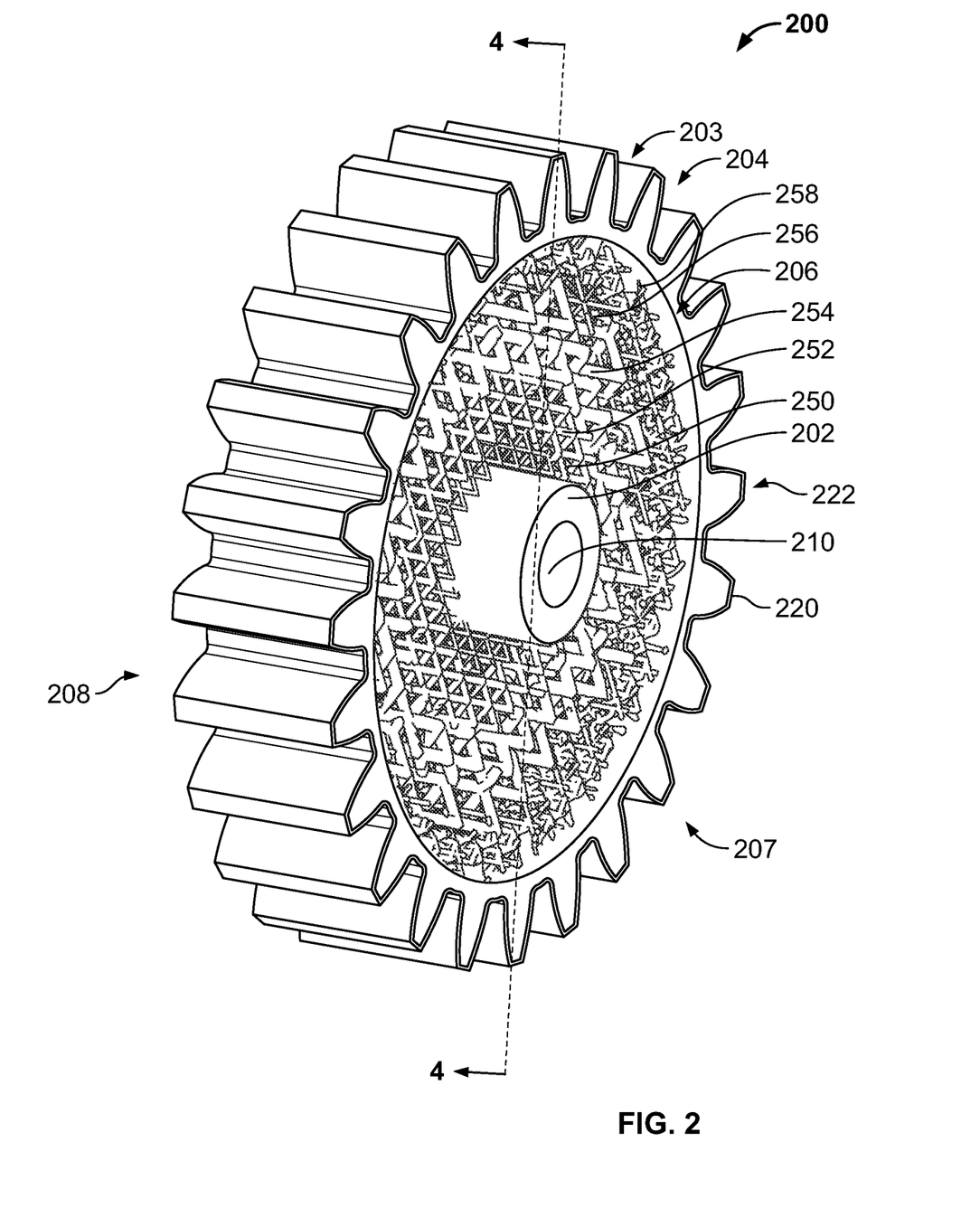
FIG. 2 is a perspective view of the lightweight gear for use with the vehicle of FIG. 1 in accordance with various embodiments.
Figure 3:
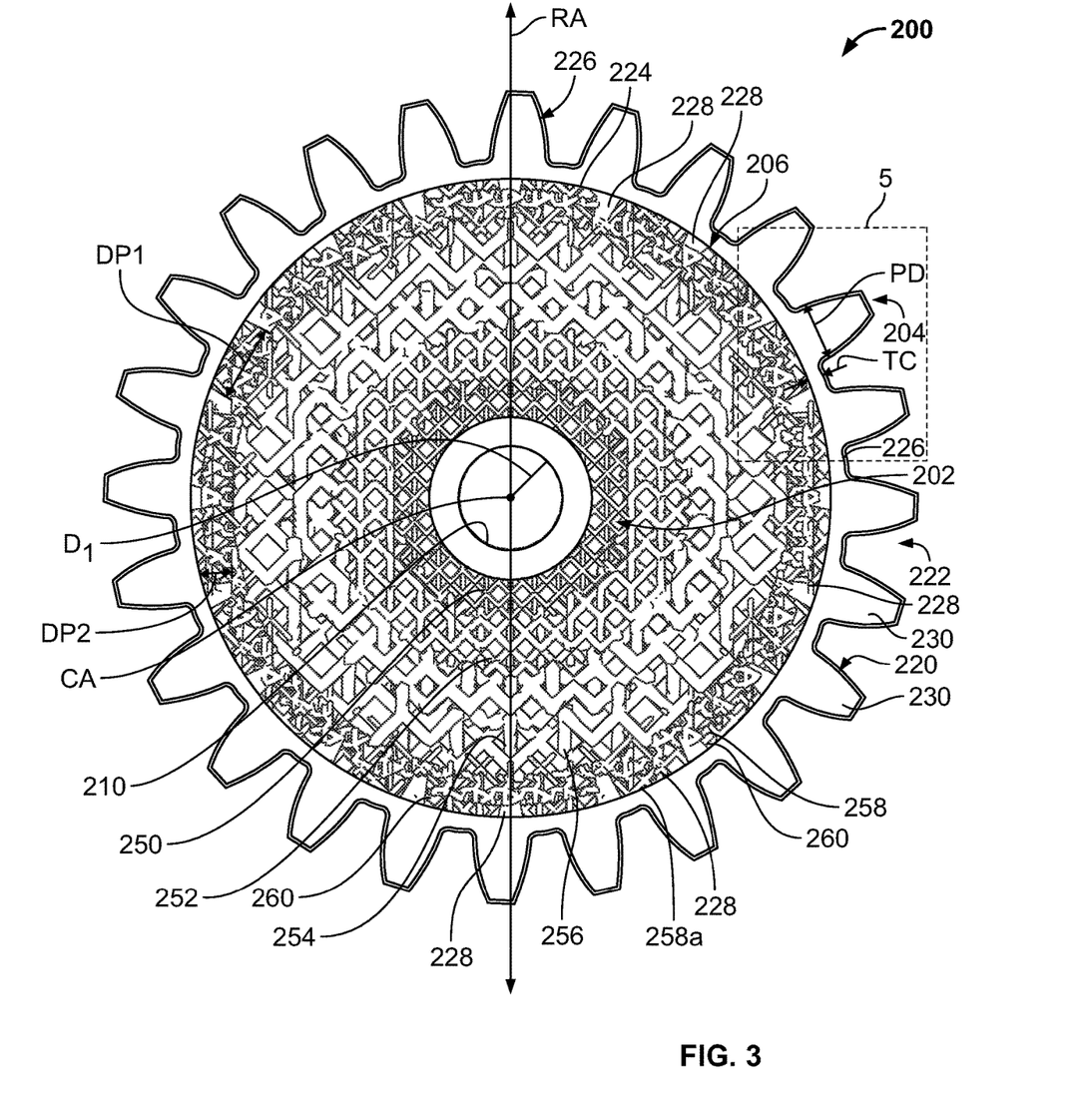
FIG. 3 is a side view of the lightweight gear of FIG. 2.

With reference to FIG. 2, a perspective view of the lightweight gear 200 is shown. The lightweight gear 200 includes a hub 202 and a tooth ring 203 including a plurality of teeth 204. The hub 202 is interconnected to the tooth ring 203 by a core or lattice structure 206. The lightweight gear 200 also has a first gear side 207 opposite a second gear side 208. The hub 202 defines a central opening 210 of the lightweight gear 200 and enables the lightweight gear 200 to be coupled to a shaft 106 (FIG. 1) to rotate with the shaft 106. In certain examples, the central opening 210 may include a notch, key, splines or other feature to non-rotatably couple the lightweight gear 200 to the shaft. The hub 202 is cylindrical, and is solid along its diameter. The hub 202 is composed of a metal or metal alloy, including, but not limited to hardened 42CrMo4 and Cres316L. The hub 202 may be formed via casting, additive manufacturing, etc. With reference to FIG. 3, the hub 202 defines a central axis CA for the lightweight gear 200, and forms an inner diameter D1 of the lightweight gear 200.

Figure 5:
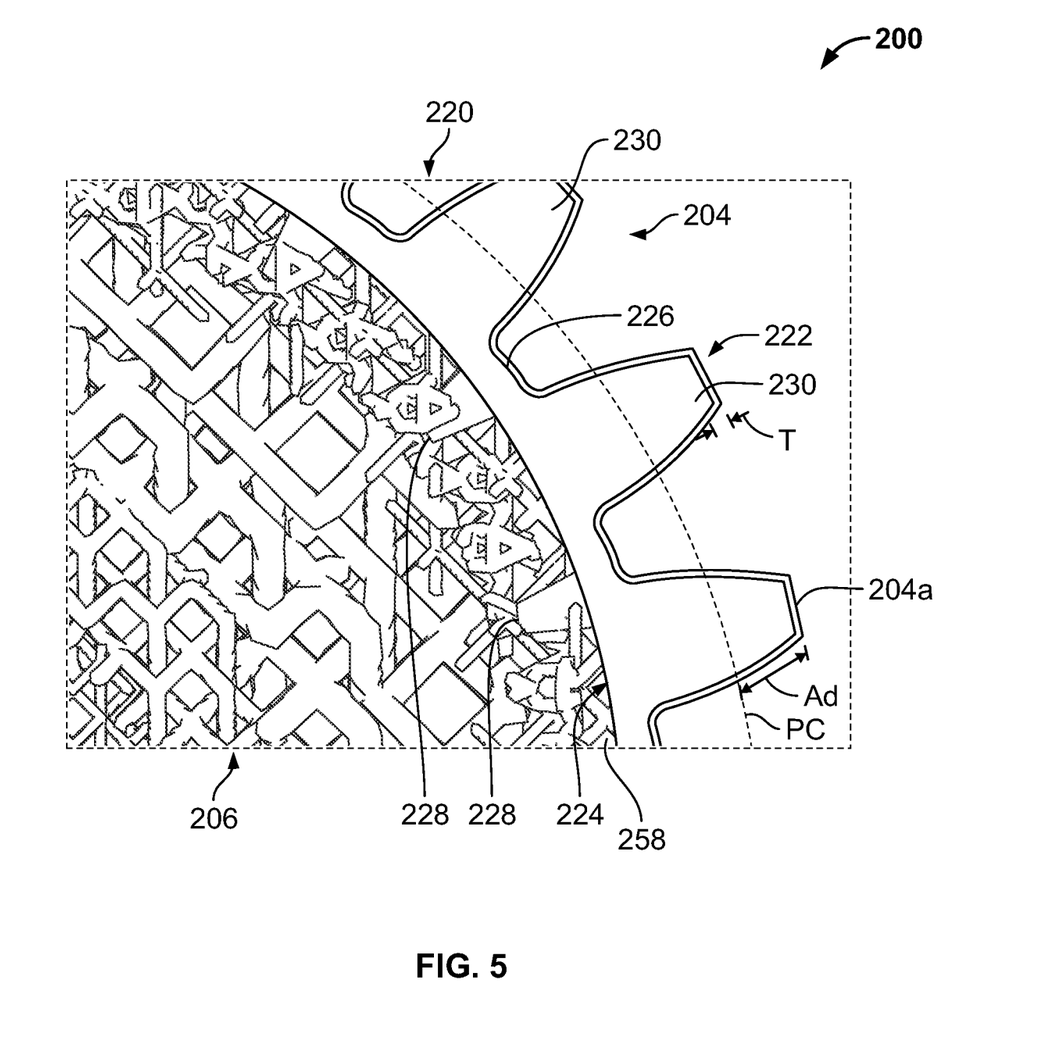
FIG. 5 is a detail view of the lightweight gear of FIG. 3, taken at 5 on FIG. 3.

The tooth ring 203 including the teeth 204 is defined about an outer circumference of the lightweight gear 200. In this example, the tooth ring 203 is defined by an inner core or inner tooth core 220 and an outer liner or outer tooth liner 222, which cooperate to form or define the teeth 204. The tooth ring 203 including the teeth 204 extends about an outer circumference of the lattice structure 206 to define the outer circumference of the lightweight gear 200. Thus, the inner tooth core 220 and the outer tooth liner 222 comprise the tooth ring 203. The inner tooth core 220 couples or interconnects the lattice structure 206 with the outer tooth liner 222. In one example, the inner tooth core 220 is composed of a polymer-based material, including, but not limited to PA-Nylon 6/6 (30% glass fiber), PA-Nylon 6,6 (30% carbon fiber), Acetal copolymer (such as DURACON® POM commercially available from Polyplastics Co., Ltd. of Tokyo, Japan), and MC (Monocast) Nylon. By composing the inner tooth core 220 out of a polymer-based material, the inner tooth core 220 provides damping and reduces noise generated by the operation of the lightweight gear 200. The inner tooth core 220 is coupled to the lattice structure 206 via injection molding, composite ply lay-up, etc. In one example, the inner tooth core 220 includes an inner perimeter 224 and opposite outer perimeter 226 and has a core thickness Tc defined between the inner perimeter 224 and the outer perimeter 226. The core thickness Tc is about 2 times to about 3 times an addendum Ad (FIG. 5) of the lightweight gear 200 to ensure that the teeth 204 remain coupled to the lattice structure 206 during operation of the lightweight gear 200. Generally, the core thickness Tc is greater than 2 times the addendum Ad. With reference to FIG. 5, the addendum Ad is a distance between a pitch circle PC of the lightweight gear 200 and a tip 204a of the tooth 204.

Figure 4:
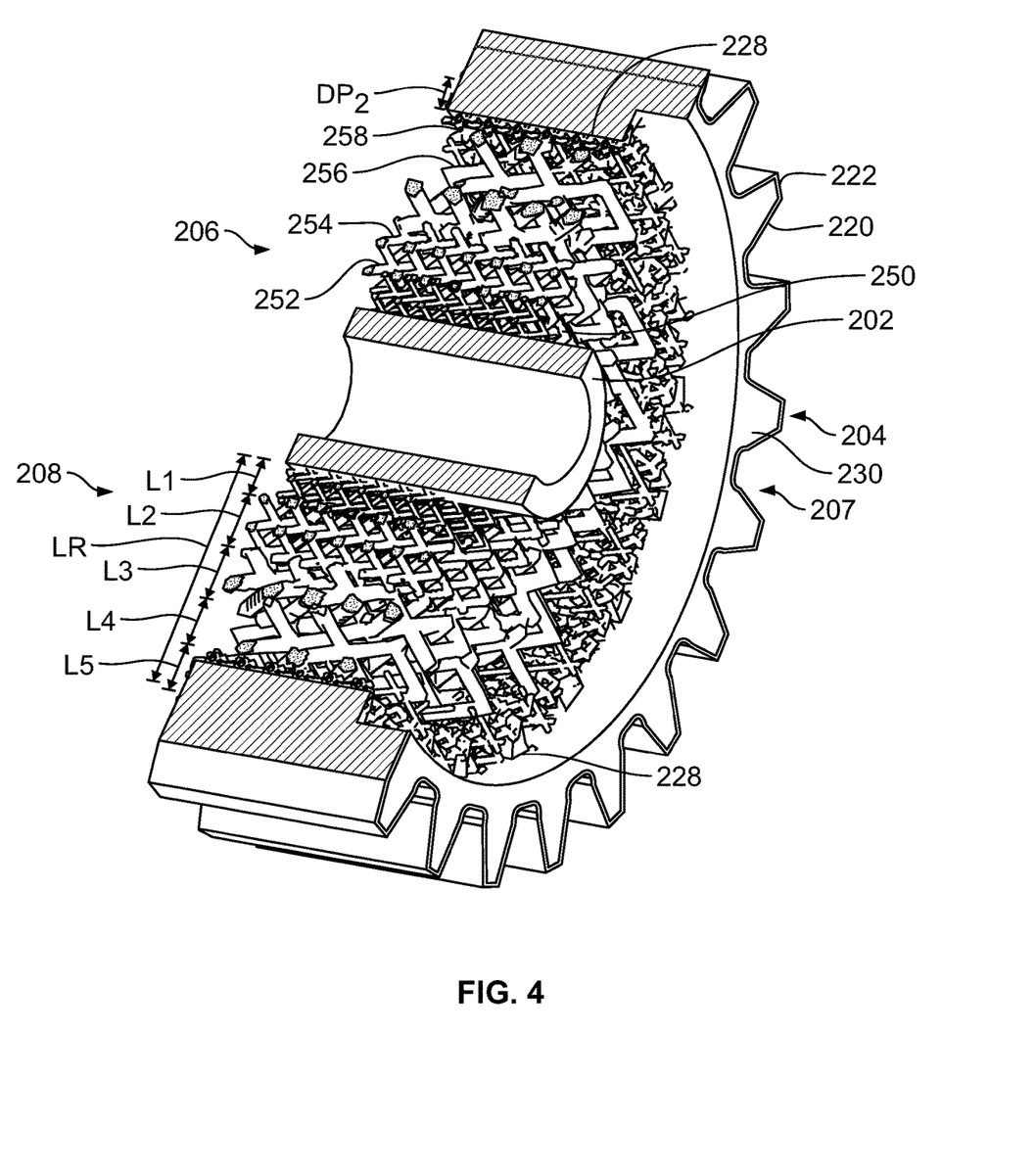
FIG. 4 is a cross-sectional view of the lightweight gear of FIG. 2, taken along line 4-4 of FIG. 2.

With reference back to FIG. 2, the inner perimeter 224 includes a plurality of spaced apart projections 228. Each of the projections 228 interlock with the lattice structure 206 to couple the inner tooth core 220 to the lattice structure 206. The projections 228 also inhibit the teeth 204 from rotating relative to the lattice structure 206. Generally, at least one projection 228 is provided between every two teeth 204 to avoid shearing near an interface of the lattice structure 206 and the inner tooth core 220. In this example, each of the projections 228 is spaced apart by a distance Dp1, which is based on a predetermined gear ratio between two mating lightweight gears 200 of the gear train 104. Each of the projections 228 generally extends into the lattice structure 206 by a depth Dp2, which is about 3 millimeters (mm) to about 4 millimeters (mm) and about 1.5 times to about 2 times a lattice cell size of the lattice structure 206 in a fifth density zone 258. In this example, the lattice cell size of the lattice structure 206 in the fifth density zone 258 is about 2 millimeters (mm). Generally, the depth Dp2 is up to a maximum of two times the addendum Ad. As shown in FIG. 4, each of the projections 228 extends axially from proximate the first gear side 207 to the second gear side 208. Each of the projections 228 also extend radially inward toward the hub 202 for coupling to the lattice structure 206. The projections 228 generally increase the load transfer capability of the lightweight gear 200. In this example, the projections 228 are recessed slightly relative to the first gear side 207, however, in other embodiments, the projections 228 may extend from the first gear side 207 to the second gear side 208.

With reference back to FIG. 3, the outer perimeter 226 of the inner tooth core 220 defines a plurality of core teeth 230. The core teeth 230 are spaced apart about the perimeter of the inner tooth core 220 by a distance Dct, which is based on the predetermined gear ratio for the lightweight gear 200 in the gear train 104. Generally, the distance Dct is different and greater than the distance Dp1, which results in at least one of the projections 228 that is not radially aligned with a respective at least one of the core teeth 230. Stated another way, a portion of the projections 228 are misaligned with a portion of the core teeth 230. In one example, there is also a different and greater number of projections 228 than the core teeth 230. This ensures that the teeth 204 remain coupled to the lattice structure 206 during operation of the lightweight gear 200. With reference to FIG. 4, each of the core teeth 230 extend axially from the first gear side 207 to the second gear side 208. Each of the core teeth 230 also extend radially outward and away from the inner tooth core 220. Generally, the core teeth 230 have a shape that accommodates the outer tooth liner 222 to form the teeth 204.

The outer tooth liner 222 is coupled to the outer perimeter 226 of the inner tooth core 220 so as to define the outer perimeter of the lightweight gear 200. The outer tooth liner 222 covers each of the core teeth 230 and forms the contact surface for each of the teeth 204. The outer tooth liner 222 is composed of a metal or metal alloy, and in one example is composed of hardened 17CrNiMo6, hardened 18CrNiMo7-6, 20MoCr4, or 20MnCr5. In one example, the outer tooth liner 222 and the hub 202 are composed of different metals or metal alloys. The outer tooth liner 222 is coupled to the inner tooth core 220 via interference fit and/or adhesives. The use of the outer tooth liner 222 provides the lightweight gear 200 with increased hardness and surface stress when compared to the use of a polymer-based material for the contact surface for the teeth 204. Generally, the outer tooth liner 222 has a hardness of about 50 HRC on the Hardness Rockwell C scale. In this example, with reference to FIG. 5, the outer tooth liner 222 is heat treated to harden the outer tooth liner 222 through a thickness T of the outer tooth liner 222. In one example, the thickness T is greater than about 0.25 to about 4 times a module of the lightweight gear 200. The module of the lightweight gear 200 is the size of one of the teeth 204, and in this example, the module of the lightweight gear 200 is about 5 millimeters (mm) when a pitch circle diameter PD (FIG. 3) of the lightweight gear 200 is about 120 millimeters (mm) and the lightweight gear 200 has about 24 teeth. In addition, the outer tooth liner 222 improves a backlash associated with the lightweight gear 200, which also reduces noise associated with the lightweight gear 200 during operation. In one example, the backlash between two lightweight gears 200 is calculated as the backlash between two gears having a pitch circle defined by the outer perimeter 226 minus two times the thickness T of the outer tooth liner 222.

Thus, in this example, each tooth 204 of the teeth 204 is composed of the core tooth 230 and a portion of the outer tooth liner 222. The teeth 204 engage with a corresponding gear of the gear train 104 (FIG. 1), such as another lightweight gear 200, to enable the lightweight gear 200 to be driven or to drive the other lightweight gear 200. Generally, the teeth 204 may have any desired characteristic to enable the teeth 204 and the lightweight gear 200 to meshingly engage with another gear of the gear train 104. In this example, the teeth 204 comprise a plurality of spur gear teeth, however, the teeth 204 may comprise gear teeth of any shape, including, but not limited to, helical, bevel, spiral bevel, hypoid, etc.

The teeth 204 are coupled to the hub 202 via the lattice structure 206. In this example, the lattice structure 206 is composed of a metal or metal alloy, including, but not limited to, Cress3161, Ferrium C64 gear steel, and C64 steel. The lattice structure 206 is integrally formed, one-piece or monolithic via additive manufacturing, such as direct metal laser sintering (DMLS), for example. Generally, the lattice structure 206 is composed of a material that is different than the material of the hub 202 and the outer tooth liner 222 to reduce weight and cost associated with the lightweight gear 200. The lattice structure 206 has a density that varies based on an operating condition of the lightweight gear 200. For example, the density varies radially based on a shear stress or load distribution experienced by the lightweight gear 200 such that a density of the lattice is nonuniform in the radial direction. In this example, with brief reference to FIG. 3, the density of the lattice structure 206 is substantially constant axially, or in a direction along the central axis CA, and varies radially or in a direction along a radial axis RA. The radial axis RA is perpendicular to the central axis CA. With reference back to FIG. 2, in this example, the lattice structure 206 includes five density zones: a first density zone 250, a second density zone 252, a third density zone 254, a fourth density zone 256 and the fifth density zone 258. Each of the first density zone 250, the second density zone 252, the third density zone 254, the fourth density zone 256 and the fifth density zone 258 has a different density of cells in associated zone of the lattice structure 206 based on the shear stress experienced during the operation of the lightweight gear 200.

With reference to FIG. 4, the first density zone 250 is coupled to the hub 202. The lattice structure 206 may be integrally formed with the hub 202, or an inner perimeter of the first density zone 250 may be fixedly coupled to the hub 202 via welding, for example. The first density zone 250 has a density of about 0.7 times to about 0.9 times a density of a fully solid metal or metal alloy structure. Stated another way, the lattice structure 206 in the first density zone 250 has a density that is about 70% to about 90% of the density of a solid metal or metal alloy structure. Generally, the first density zone 250 has the greatest density or is the densest portion of the lattice structure 206 due to shear stress experienced at the hub 202 during operation of the lightweight gear 200. In the first density zone 250, a size of the lattice is smaller, which enables a high concentration of the lattice within the first density zone 250. For example, a cell size of the lattice structure 206 in the first density zone 250 is about 2 millimeters (mm). The first density zone 250 extends for a length L1, which is radially about 7.5 millimeters (mm) to about 13 millimeters (mm) in the example of the lightweight gear 200 having a radius Lr of the lattice structure 206 of about 50 millimeters (mm). In this example, the first density zone 250 extends for about 20% of the radius Lr of the lattice structure 206. In the example of the lightweight gear 200 composed of Cress3161, a relative density of the first density zone 250 is about 5.55 grams per cubic centimeters (g/cm$^3$) to about 7.13 grams per cubic centimeters (g/cm$^3$). Generally, the relative density is calculated by multiplying the density of the material by a volume fraction occupied by the lattice structure 206 in the first density zone 250 so that void space is not included in the density calculation.

The second density zone 252 is coupled or integrally formed between the first density zone 250 and the third density zone 254. The second density zone 252 has a density of about 0.65 times to about 0.75 times the density of the fully solid metal or metal alloy structure. Stated another way, the lattice structure 206 in the second density zone 252 has a density that is about 65% to about 75% of the density of the solid metal or metal alloy structure. Generally, the second density zone 252 has a density that is less than the first density zone 250 and greater than the third density zone 254. In the second density zone 252, a size of the lattice is larger, which enables a lower concentration of the lattice within the second density zone 252 when compared to the first density zone 250. For example, a cell size of the lattice structure 206 in the second density zone 252 is about 3 millimeters (mm) to about 4 millimeters (mm). The second density zone 252 extends for a length L2, which is about 7 millimeters (mm) to about 12.5 millimeters (mm). In this example, the second density zone 252 extends for about 18% of the radius Lr of the lattice structure 206.

The third density zone 254 is coupled or integrally formed between the second density zone 252 and the fourth density zone 256. The third density zone 254 has a density of about 0.4 times to about 0.65 times the density of the fully solid metal or metal alloy structure. Stated another way, the lattice structure 206 in the third density zone 254 has a density that is about 40% to about 65% of the density of the solid metal or metal alloy structure. Generally, the third density zone 254 has a density that is less than each of the first density zone 250, the second density zone 252, the fourth density zone 256 and the fifth density zone 258. Thus, the third density zone 254 is the least dense portion of the lattice structure 206 as the third density zone 254 generally experiences the least amount of shear stress or load. In the third density zone 254, a size of the lattice is larger, which results in a low concentration of the lattice within the third density zone 254. For example, a cell size of the lattice structure 206 in the third density zone 254 is about 4 millimeters (mm) to about 6 millimeters (mm). The third density zone 254 extends for a length L3, which is about 9.5 millimeters (mm) to about 15 millimeters (mm). In this example, the third density zone 254 extends for about 24% of the radius Lr of the lattice structure 206.

The fourth density zone 256 is coupled or integrally formed between the third density zone 254 and the fifth density zone 258. The fourth density zone 256 has a density of about 0.6 times to about 0.75 times the density of the fully solid metal or metal alloy structure. Stated another way, the lattice structure 206 in the fourth density zone 256 has a density that is about 60% to about 75% of the density of the solid metal or metal alloy structure. Generally, the fourth density zone 256 has a density that is less than each of the first density zone 250, the second density zone 252 and the fifth density zone 258. The density of the fourth density zone 256 is greater than the density of the third density zone 254. In the fourth density zone 256, a size of the lattice is smaller than the size of the lattice in the third density zone 254, which results in a larger concentration of the lattice within the fourth density zone 256. For example, a cell size of the lattice structure 206 in the fourth density zone 256 is about 3 millimeters (mm) to about 4 millimeters (mm). The fourth density zone 256 extends for a length L4, which is about 7 millimeters (mm) to about 12.5 millimeters (mm). In this example, the fourth density zone 256 extends for about 18% of the radius Lr of the lattice structure 206.

The fifth density zone 258 is coupled or integrally formed with the fourth density zone 256. The fifth density zone 258 has a density of about 0.70 times to about 0.80 times the density of the fully solid metal or metal alloy structure. Stated another way, the lattice structure 206 in the fifth density zone 258 has a density that is about 70% to about 80% of the density of the solid metal or metal alloy structure. Generally, the fifth density zone 258 has a density that is greater than each of the second density zone 252, the third density zone 254 and the fourth density zone 256. The density of the fifth density zone 258 is less than the density of the first density zone 250. The density of the fifth density zone 258 is predetermined based on the amount of shear stress or load received by the teeth 204. In the fifth density zone 258, a size of the lattice is greater than the size of the lattice in the first density zone 250, which results in a larger concentration of the lattice within the fifth density zone 258. The fifth density zone 258 has cells that are about 2 millimeters (mm) in size. The fifth density zone 258 extends for a length L5, which is about 7.5 millimeters (mm) to about 13 millimeters (mm). In this example, the fifth density zone 258 extends for about 20% of a radius Lr of the lattice structure 206. With reference back to FIG. 3, the fifth density zone 258 also defines a plurality of channels 260 that extend axially about a perimeter 258a of the fifth density zone 258. Each channel 260 receives a respective one of the projections 228 to couple the tooth ring 203 including the teeth 204 to the lattice structure 206 at the fifth density zone 258. It should be noted that while the tooth ring 203 is described herein as including the projections 228 and the fifth density zone 258 is described herein as including the channels 260, the tooth ring 203 may be coupled to the lattice structure 206 by injection molding the inner tooth core 220 about the perimeter 258a of the fifth density zone 258 and the resulting structure may not include defined projections 228 and channels 260 as shown herein.

In the example of the lightweight gear 200 having the pitch diameter PD (FIG. 3) of 120 millimeters (mm), the lattice structure 206 having the radius Lr of 50 millimeters (mm), the lattice structure 206 composed of Cress3161 and the outer tooth liner 222 composed of hardened 17CrNiMo6, the first density zone 250 experiences a stress of about 128 Newtons per millimeter squared (N/mm$^2$); the second density zone 252 experiences a stress of about 110 Newtons per millimeter squared (N/mm$^2$); the third density zone 254 experiences a stress of about 74 Newtons per millimeter squared (N/mm$^2$); the fourth density zone 256 experiences a stress of about 105 Newtons per millimeter squared (N/mm$^2$); and the fifth density zone 258 experiences a stress of about 120 Newtons per millimeter squared (N/mm$^2$).

Thus, generally, the lattice structure 206 is the densest at or proximate the hub 202, transitions to less dense between the hub 202 and about 50% of the radius Lr of the lattice structure 206, and transitions from less dense to denser at or proximate the teeth 204. By varying the density of the core or lattice structure 206 radially based on the shear stress and load distribution, a weight of the lightweight gear 200 is reduced as less material is used in the lower density zones while maintaining the performance of the lightweight gear 200, which provides a weight savings. Generally, each of the density zones 250-258 is composed of a plurality of cells, which replicate to form the lattice within the particular density zone 250-258. The shape of the cell in a respective density zone 250-258 includes, but is not limited to, body-centered cubic (BCC), body-centered cubic with Z-struts (BCCZ), Octahedroid, Octahedroid with struts, triply periodic minimal surfaces (TPMS), and dodecahedron. In certain instances, the shape of the cells of each of the density zones 250-258 may be different. For example, the first density zone 250 and the fifth density zone 258 may include cells with more crosslinking struts, such as dodecahedron cells due to the higher stress experienced by the first density zone 250 and the fifth density zone 258. The third density zone 254, which experiences lower stress and is less dense, may include body-centered cubic cells or Octahedroid cells with struts. The second density zone 252 and the fourth density zone 256 may each include triply periodic minimal surfaces (TPMS) cells. In other examples, the density zones 250-258 may have cells with the same shape. It should be noted that the dimensions and values provided herein are merely examples, and are not intended to limit the scope of the present disclosure.

Figure 6:
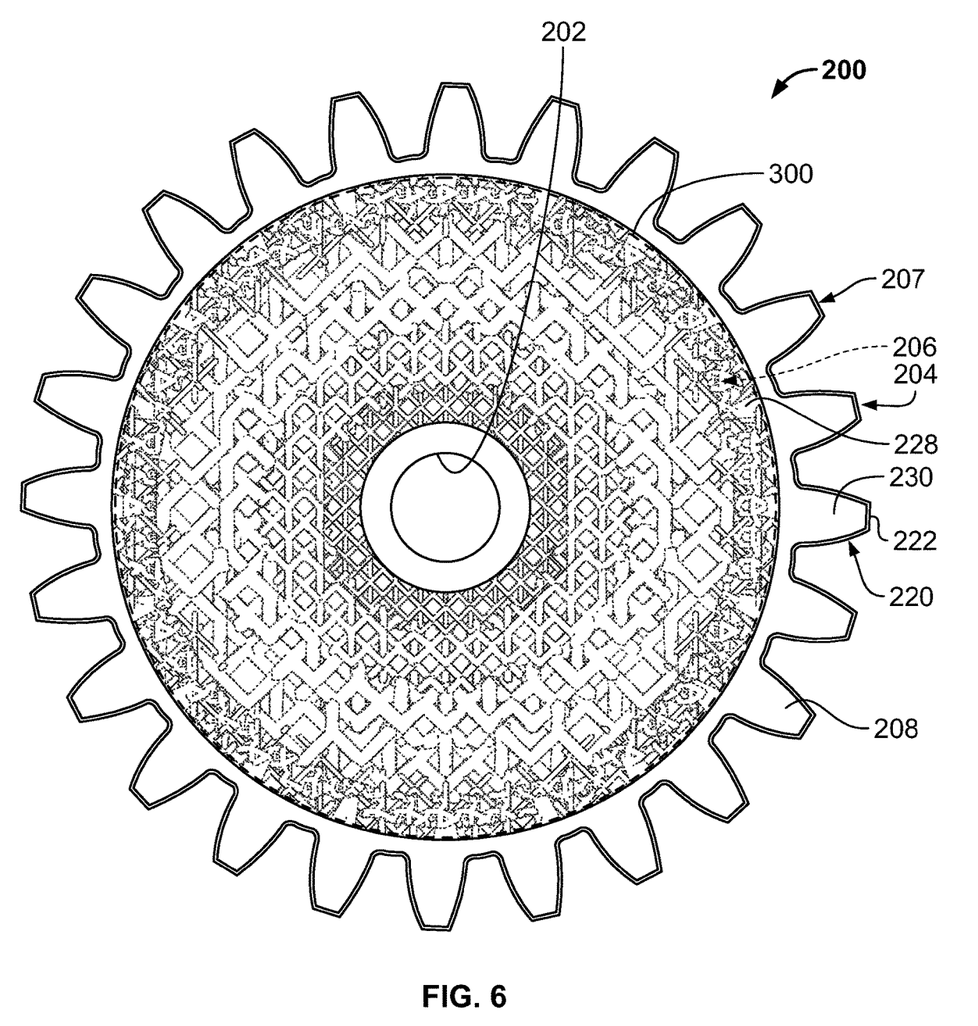
FIG. 6 is a side view of another exemplary lightweight gear for use with the vehicle of FIG. 1 in accordance with various embodiments.

It should be noted that in other applications, it may be desirable to further strengthen the lightweight gear 200. For example, with reference to FIG. 6, the lightweight gear 200 is shown with a polymer-based coating 300. In this example, the lattice structure 206 of the lightweight gear 200 of FIG. 6 is injection molded with the polymer-based coating 300 to provide additional strength to the lightweight gear 200. The polymer-based material of the polymer-based coating 300 includes, but is not limited to, PA-Nylon 6/6 (30% glass fiber), PA-Nylon 6,6 (30% carbon fiber), Acetal copolymer (such as DURACON® POM commercially available from Polyplastics Co., Ltd. of Tokyo, Japan), and MC (Monocast) Nylon. Generally, the polymer-based coating 300 is injection molded through the lattice structure 206 to extend axially from the first gear side 207 to the second gear side 208. In one example, the polymer-based coating 300 is injected into the first gear side 207 or the second gear side 208 and flows through the lattice structure 206 to the opposing side; however, in other examples, the polymer-based coating 300 may be injected into both the first gear side 207 and the second gear side 208. It should be noted that other techniques, such as spray coating, void filling, etc. may be employed to couple the polymer-based coating 300 to the lightweight gear 200.

It should be noted that in other embodiments, the lightweight gear 200 may be configured differently to engage with another gear of the gear train 104 (FIG. 1). For example, with reference to FIG. 7, a lightweight gear 400 is shown. As the lightweight gear 400 includes components that are the same or similar to components of the lightweight gear 200 discussed with regard to FIGS. 1-6, the same reference numerals will be used to denote the same or similar components. In this example, the lightweight gear 400 includes a hub 402 and a tooth ring 403 including a plurality of teeth 404. The hub 402 is interconnected to the tooth ring 403 by the core or lattice structure 206. In this example, the lightweight gear 400 includes at least one or a pair of composite panels 406, and the lattice structure 206 is sandwiched between the composite panels 406. The lightweight gear 400 has a first gear side 407 opposite a second gear side 408. The hub 402 defines the central opening 210 of the lightweight gear 400 and enables the lightweight gear 400 to be coupled to a shaft, such as the shaft 106, (FIG. 1) to rotate the shaft 106. The hub 402 is cylindrical, and is solid along its diameter. The hub 402 is composed of a metal or metal alloy, including, but not limited to hardened 42CrMo4 and Cres316L. The hub 402 may be formed via casting, additive manufacturing, etc. The hub 402 defines a central axis CA4 for the lightweight gear 400, and forms an inner diameter D14 of the lightweight gear 400. In this example, the hub 402 extends for a distance D15 beyond the lattice structure 206 to pass through a respective one of the composite panels 406. Each of the composite panels 406 has an opening 406a, and the hub 402 extends through the opening 406a. Generally, the distance D15 is sized to enable the composite panels 406 to be positioned adjacent to and in contact with the lattice structure 206 without extending outwardly from the respective first gear side 407 or the second gear side 408. In one example, the distance D15 is about 2.15 millimeters (mm) to about 3.2 millimeters (mm).

Figure 7:
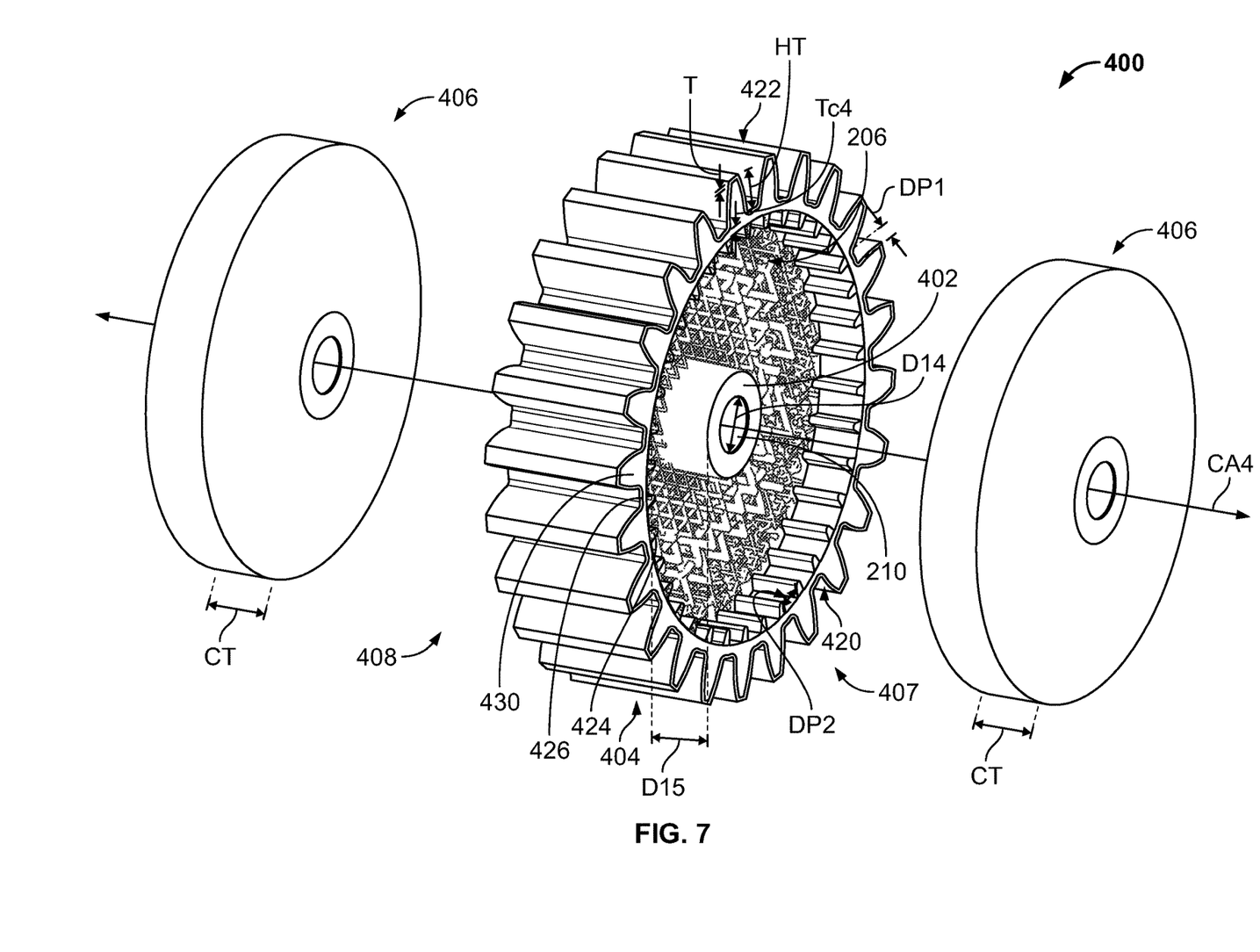
FIG. 7 is an exploded perspective view of another exemplary lightweight gear for use with the vehicle of FIG. 1 in accordance with various embodiments.

The tooth ring 403 including the teeth 404 is defined about an outer circumference of the lightweight gear 400. In this example, the tooth ring 403 is defined by an inner tooth core 420 and an outer tooth liner 422, which cooperate to form or define the teeth 404. The tooth ring 403 including the teeth 404 extends about an outer circumference of the lattice structure 206 to define the outer circumference of the lightweight gear 400. Thus, the inner tooth core 420 and the outer tooth liner 422 comprise the tooth ring 403. The teeth 404 also extend the distance D15 beyond the lattice structure 206 on either side of the lattice structure 206 to accommodate the composite panels 406. The inner tooth core 420 couples or interconnects the lattice structure 206 and the composite panels 406 with the outer tooth liner 222. In one example, the inner tooth core 420 is composed of a polymer-based material, including, but not limited to PA-Nylon 6/6 (30% glass fiber), PA-Nylon 6,6 (30% carbon fiber), Acetal copolymer (such as DURACON® POM commercially available from Polyplastics Co., Ltd. of Tokyo, Japan), and MC (Monocast) Nylon. By composing the inner tooth core 420 out of a polymer-based material, the inner tooth core 420 provides damping and reduces noise generated by the operation of the lightweight gear 400. The inner tooth core 420 is coupled to the lattice structure 206 via injection molding, composite ply lay-up, etc.

In one example, the inner tooth core 420 includes an inner perimeter 424 and opposite outer perimeter 426, and has a core thickness Tc4 defined between the inner perimeter 424 and the outer perimeter 426. The core thickness Tc4 is about 0.9 to about 1 times a height Ht of the teeth 404 to ensure that the teeth 404 remain coupled to the lattice structure 206 during operation of the lightweight gear 400. In this example, the core thickness Tc4 is about 10 millimeters (mm) to about 11 millimeters (mm). The inner perimeter 424 includes a plurality of spaced apart projections 428. Each of the projections 428 interlock with the lattice structure 206 and the composite panels 406 to couple the inner tooth core 420 to the lattice structure 206. The projections 428 also inhibit the teeth 404 from rotating relative to the lattice structure 206. In this example, each of the projections 428 is spaced apart by the distance Dp1. Each of the projections 428 generally extends into the lattice structure 206 by the depth Dp2. Each of the projections 428 extends axially from the first gear side 407 to the second gear side 408, and in this example, each of the projections 428 extend the distance D15 beyond the lattice structure 206 to enable the composite panels 406 to be coupled to the lattice structure 206. Each of the projections 428 also extend radially inward toward the hub 402 for coupling to the lattice structure 206 and the composite panels 406. It should be noted that in other embodiments, the inner tooth core 420 may not include the plurality of projections 428, but rather, may be a cylinder that is coupled or formed onto the lattice structure 206 if the stress experienced by the lightweight gear 200 is low.

The outer perimeter 426 of the inner tooth core 420 defines a plurality of core teeth 430. The core teeth 430 are spaced apart about the perimeter of the inner tooth core 420 by the distance Dct. At least one of the projections 428 is not radially aligned with at least one of the core teeth 430. Stated another way, a portion of the projections 428 are misaligned with a portion of the core teeth 430. In one example, there is a different and greater number of projections 428 than the core teeth 430. This ensures that the teeth 404 remain coupled to the lattice structure 206 during operation of the lightweight gear 400. Each of the core teeth 430 extend axially from the first gear side 407 to the second gear side 408. Each of the core teeth 430 also extend radially outward and away from the inner tooth core 420. Generally, the core teeth 430 have a shape that accommodates the outer tooth liner 422 to form the teeth 404.

The outer tooth liner 422 is coupled to the outer perimeter 426 of the inner tooth core 420 so as to define the outer perimeter of the lightweight gear 400. The outer tooth liner 422 covers each of the core teeth 430 and forms the contact surface for each of the teeth 404. The outer tooth liner 422 is composed of a metal or metal alloy, and in one example is composed of hardened 20MoCr4 or 20MnCr5. In one example, the outer tooth liner 422 and the hub 402 are composed of a different metal or metal alloy. The outer tooth liner 422 is coupled to the inner tooth core 420 via an interference fit and/or adhesives. The use of the outer tooth liner 422 provides the lightweight gear 400 with increased hardness and surface stress over the use of a polymer-based material for the contact surface for the teeth 404. Generally, the outer tooth liner 422 has a hardness of about 50 HRC on the Hardness Rockwell C scale. In this example, the outer tooth liner 422 is heat treated to harden the outer tooth liner 422 through the thickness T of the outer tooth liner 422. In addition, the outer tooth liner 422 improves a backlash associated with the lightweight gear 400, which also reduces noise associated with the lightweight gear 400 during operation. In one example, the backlash between two lightweight gears 400 is calculated as the backlash between two gears having a pitch circle defined by the outer perimeter 426 minus two times the thickness T of the outer tooth liner 422.

Thus, in this example, each tooth 404 of the teeth 404 is composed of the core tooth 430 and a portion of the outer tooth liner 422. The teeth 404 engage with a corresponding gear of the gear train 104 (FIG. 1), such as another lightweight gear 200, 400 to enable the lightweight gear 400 to enable the lightweight gear 400 to be driven or to drive the other lightweight gear 200, 400. Generally, the teeth 404 may have any desired characteristic to enable the teeth 404 and the lightweight gear 400 to meshingly engage with another gear of the gear train 104. In this example, the teeth 404 comprise a plurality of spur gear teeth, however, the teeth 404 may comprise gear teeth of any shape, including, but not limited to, helical, bevel, spiral bevel, hypoid, etc.

The tooth ring 403 is coupled to the hub 402 via the lattice structure 206. The composite panels 406 are coupled to opposed sides of the lattice structure 206 such that the first gear side 407 and the second gear side 408 are defined by a respective one of the composite panels 406. Each of the composite panels 406 is composed of a polymer-based material, including, but not limited to carbon fiber reinforced polymer-based material, glass fiber reinforced composite, aramid fiber reinforced polymer, and graphite prepreg material. The composite panels 406 are each formed via composite ply lay-up and coupled to the lattice structure 206 after the additive manufacture of the lattice structure 206. Generally, each of the composite panels 406 is formed to have a plurality of layers to result in a thickness CT, which is substantially the same as the distance D15 to provide a uniform appearance on the first gear side 407 and the second gear side 408. In one example, the composite panels 406 are composed of about 6 to about 9 sheets of prepreg material, and a single sheet of prepreg is about 3.5 millimeters (mm).

In one example, in order to assemble the lightweight gear 200, 400, with the hub 202, 402 formed, the lattice structure 206 is additively manufactured onto the hub 202, 402. The inner tooth core 220, 420 is coupled to or formed on the lattice structure 206 such that the projections 228, 428 engage with the channels 260 of the fifth density zone 258. The outer tooth liner 222, 422 is coupled to the inner tooth core 220, 420 to define the outer perimeter of the lightweight gear 200, 400. In the example of the lightweight gear 200 including the polymer-based coating 300, the polymer-based coating 300 is applied, via injection molding, for example, to the first gear side 207 and/or the second gear side 208 so as to infiltrate the lattice structure 206. In the example of the lightweight gear 400, the composite panels 406 are each formed and coupled to the lattice structure 206 to have the thickness CT that results in a uniform surface for the first gear side 407 and the second gear side 408, respectively.

With the lightweight gear 200, 400 assembled, with reference to FIG. 1, the lightweight gear 200, 400 may be coupled to the shaft 106 via the hub 202, 402 and installed into the gear box 102 such that the teeth 204 engage with another gear of the gear train 104. The lightweight gear 200, 400 cooperates with the gear train 104 to generate torque to start the engine 112 or to drive the rotor 114. The lattice structure 206 of the lightweight gear 200, 400 reduces a weight of the lightweight gear 200, 400 by providing the varying density zones 250-258 in the radial direction. The outer tooth liner 222, 422 ensures that the lightweight gear 200 has sufficient hardness, and the inner tooth core 220, 420 assists in reducing noise during the operation of the lightweight gear 200, 400.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A lightweight gear, comprising:
   a hub;
   a tooth ring defining a plurality of gear teeth, the tooth ring including an inner core composed of a polymer-based material that is coupled to a lattice structure; and
   the lattice structure interconnecting the hub and the tooth ring, the lattice structure having a density that varies radially based on an operating condition of the lightweight gear and the lattice structure is composed of a metal or a metal alloy,
   wherein:
      the tooth ring includes an outer liner coupled to the inner core that defines contact surfaces for the plurality of gear teeth;
      the outer liner is composed of a second metal or a second metal alloy; and
      the inner core includes a plurality of projections that extend radially inward to couple to the lattice structure.

2. The lightweight gear of claim 1, wherein the inner core includes a plurality of core teeth opposite the plurality of projections, and the outer liner is coupled to the plurality of core teeth to define the plurality of gear teeth.

3. The lightweight gear of claim 2, wherein a portion of the plurality of core teeth are radially misaligned with a portion of the plurality of projections.

4. The lightweight gear of claim 1, wherein the lattice structure defines a plurality of channels about an outer perimeter of the lattice structure, and each channel of the plurality of channels extends axially and is configured to receive a projection of the plurality of projections.

5. The lightweight gear of claim 1, wherein the lightweight gear further comprises a polymer-based coating coupled to the lattice structure.

6. The lightweight gear of claim 1, wherein the lightweight gear further comprises at least one panel of polymer-based material coupled to at least one side of the lattice structure.

7. The lightweight gear of claim 1, wherein the operating condition of the lightweight gear is a shear stress.

8. The lightweight gear of claim 1, wherein the lattice structure has a first zone with a first density at the hub that is different and greater than a zone density of a zone of the lattice structure at the tooth ring.

9. A lightweight gear for a vehicle, comprising:
   a hub composed of a first metal or a first metal alloy;
   a tooth ring including an inner core and an outer liner that cooperate to define a plurality of gear teeth, the inner core composed of a polymer-based material that is coupled to a lattice structure and the outer liner is composed of a second metal or a second metal alloy; and
   the lattice structure interconnecting the hub and the inner core of the tooth ring, the lattice structure having a density that varies radially, with a first zone having a first density proximate the hub that is different and greater than a zone density of a zone of the lattice structure proximate the inner core, and the lattice structure is composed of a metal or a metal alloy,
   wherein the inner core includes a plurality of projections that extend radially inward to couple to the lattice structure and includes a plurality of core teeth opposite the plurality of projections, at least one of the plurality of projections misaligned with at least one of the plurality of core teeth, and the outer liner is coupled to the plurality of core teeth to define the plurality of gear teeth.

10. The lightweight gear of claim 9, wherein between the first zone and the zone, the lattice structure has a second zone with a second density that is less than the first density and the zone density.

11. The lightweight gear of claim 9, wherein the lightweight gear further comprises a polymer-based coating coupled to the lattice structure.

12. The lightweight gear of claim 9, wherein the lightweight gear further comprises at least one panel of polymer-based material coupled to at least one side of the lattice structure.

13. A lightweight gear, comprising:
   a hub;
   a tooth ring defining a plurality of gear teeth, the tooth ring including an inner core composed of a polymer-based material that is coupled to a lattice structure; and
   the lattice structure interconnecting the hub and the tooth ring, the lattice structure having a density that varies radially based on an operating condition of the lightweight gear and the lattice structure is composed of a metal or a metal alloy,
   wherein:
      the lattice structure has a first zone with a first density at the hub that is different and greater than a zone density of a zone of the lattice structure at the tooth ring; and
      the lattice structure has a second zone with a second density between the first zone and the zone, and the second density is less than the first density and the zone density.

14. The lightweight gear of claim 13, wherein the lattice structure has a third zone with a third density between the second zone and the zone, and the third density is less than the second density.

15. The lightweight gear of claim 14, wherein the lattice structure has a fourth zone with a fourth density between the third zone and the zone, and the fourth density is greater than the third density.

16. The lightweight gear of claim 14, wherein a cell of the lattice structure in the third zone has a different shape than a cell of the lattice structure in the first zone.

17. The lightweight gear of claim 13, wherein the tooth ring includes an outer liner coupled to the inner core that defines contact surfaces for the plurality of gear teeth.

18. The lightweight gear of claim 17, wherein the outer liner is composed of a second metal or a second metal alloy.

19. The lightweight gear of claim 17, wherein the lattice structure defines a plurality of channels about an outer perimeter of the lattice structure, and each channel of the plurality of channels extends axially and is configured to receive a projection of the plurality of projections.

* * * * *